United States Patent [19]

Bergthaller et al.

[11] Patent Number: 4,559,296

[45] Date of Patent: Dec. 17, 1985

[54] PHOTOGRAPHIC RECORDING MATERIAL CONTAINING NEW AZO DYES

[75] Inventors: Peter Bergthaller; Lothar Rosenhahn; Karl J. Herd; Hauke Fuerstenwerth, all of Cologne; Rudolf Stolzenburg, Langenfeld, all of Fed. Rep. of Germany

[73] Assignee: Agfa-Gevaert Aktiengesellschaft, Leverkusen, Fed. Rep. of Germany

[21] Appl. No.: 603,694

[22] Filed: Apr. 25, 1984

[30] Foreign Application Priority Data

May 7, 1983 [DE] Fed. Rep. of Germany ....... 3316887

[51] Int. Cl.$^4$ ................................................. G03C 1/84
[52] U.S. Cl. .................................... 430/519; 430/561; 430/562; 430/591; 534/772
[58] Field of Search ............... 430/519, 561, 562, 563, 430/591; 260/156; 534/772

[56] References Cited

U.S. PATENT DOCUMENTS 4,002,425  1/1977  Heinrich et al. .................... 534/772
4,032,308  5/1978  Hegar ................................. 534/772
4,294,916  10/1981  Postle et al. ......................... 430/591
4,359,418  11/1982  Lienhard et al. ................... 534/772

Primary Examiner—Jack P. Brammer
Attorney, Agent, or Firm—Connolly and Hutz

[57] ABSTRACT

New dyes corresponding to the following general formula:

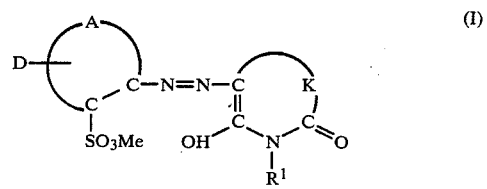

wherein the substituents are as defined in the specification, are suitable for use in photographic recording materials.

11 Claims, No Drawings

PHOTOGRAPHIC RECORDING MATERIAL CONTAINING NEW AZO DYES

This invention relates to a photographic recording material comprising at least one photosensitive silver halide emulsion layer and, optionally, other layers. At least one layer contains a new azo dye. The present invention also relates to the new azo dyes themselves.

Photographic recording materials comprising photosensitive silver halide emulsion layers generally contain filter and antihalation layers for absorbing unwanted light. In order, in colour photographic recording materials, to suppress the effect of blue light on the red- and green-sensitive layers, these materials may contain a yellow filter layer above the layers to be protected. This yellow filter layer generally contains either colloidal yellow silver or a yellow dye, for example the azo dye tartrazine, known from U.S. Pat. No. 3,672,898. The dyes may be fixed by mordants. Other azo dyes are known, for example, from German Offenlegungsschrift Nos. 1,930,491; 2,123,061; 2,162,612; 2,349,709 and 2,902,486 and U.S. Pat. Nos. 3,956,263, 4,001,205, 4,067,864, 4,092,308 and 4,359,418, which, however, are not concerned with photographic applications.

Where colloidal silver is used in yellow filter layers, intensified physical development may result in a considerable deterioration in the graininess of the material and in an increase in fogging. Although these disadvantages are avoided where dyes are used, dye-based filter layers generally have to be cast in a greater layer thickness than corresponding layers of colloidal silver to achieve the same filter density. This results in greater scattering of the light and, hence, in a loss of image definition.

New azo dyes have now been found which are eminently suitable for use as dyes, particularly as filter dyes in photographic recording materials. They correspond to the following general formula:

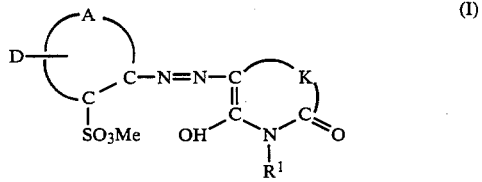

(I)

wherein
A represents the radical required to complete a diazo component of the benzene series;
K represents the radical required to complete a coupling component from the class of hydroxy pyridones;
D represents a group having electron donor properties which is in the p-position to the azo group;
$R^1$ represents H or optionally substituted alkyl, cycloalkyl, aryl or aralkyl;
Me represents hydrogen or a cation, particularly an alkali metal, for example Li or Na;
with the proviso that at least one other water-solubilising group, particularly a sulphonic acid or carboxyl group, is present.

In a preferred embodiment, $R^1$ and/or K contain(s) a solubilising group, for example a sulphonic acid or carboxyl group.

In a preferred embodiment, the compounds do not contain groups which would result in the irreversible colouring of gelatin.

In a preferred embodiment, the coupling component completed by K is a hydroxy pyridone corresponding to the following general formula:

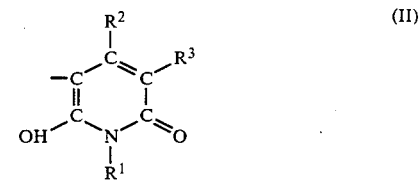

(II)

wherein
$R^1$ is as defined above;
$R^2$ represents alkyl, particularly containing from 1 to 4 carbon atoms, for example methyl, or an optionally esterified carboxyl group or a substituted alkyl radical for example $-CH_2-SO_3Me$;
$R^3$ represents hydrogen or a functional group.

The radical $R^1$ is preferably an alkyl radical containing from 1 to 4 carbon atoms, for example a methyl radical, and may be substituted by a solubilising group, for example a sulphonic acid group.

Another preferred meaning for $R^1$ is an optionally substituted cyclohexyl, phenyl or benzyl group.

Preferred functional groups which may be represented by $R^3$ are $SO_3Me$, $-CH_2CO_2Me$, $-CH_2SO_3Me$, $-SO_2CH_3$, $-CONH_2$, $-CN$, acyl, especially $-COCH_3$ or esterified carboxyl.

In one preferred embodiment, the diazo component completed by A is a phenyl radical corresponding to the following general formula:

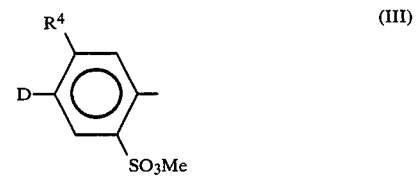

(III)

wherein
D and Me are as defined above; and
$R^4$ represents hydrogen or alkyl, particularly $C_1-C_4$ alkyl, for example methyl, or an alkoxy group, preferably a $C_1-C_4$ alkoxy group, or halogen, for example Cl.

The radical D in general formulae (I) and (III) is distinguished by its electron donor properties. In one preferred embodiment, the substituents in question are substituents of which the substituent constant δ for the p-position according to the known Hammett equation $$\left(\lg \frac{k}{k_o} = \rho\sigma\right)$$

amounts to from about +0.23 to −0.30. The substituent constant δ quoted herein for the p-position is referred to in the literature as $\delta_p$, cf. for example "Organikum⇌, 1967, VEB Deutscher Verlag der Wissenschaften Berlin, pages 133 to 138. In one preferred embodiment, D represents an alkyl group, particularly methyl, an alkoxy group, a phenoxy group, an acylamino group or an -continued
| No. | Structure | λmax. (nm) |
|---|---|---|
| 3 | 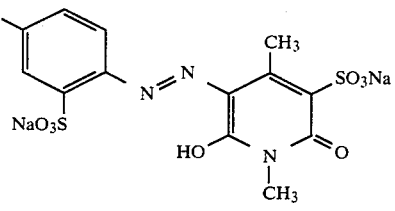 | 438 |
| 4 | 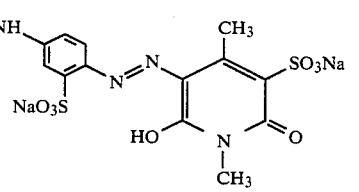 | 442 |
| 5 | 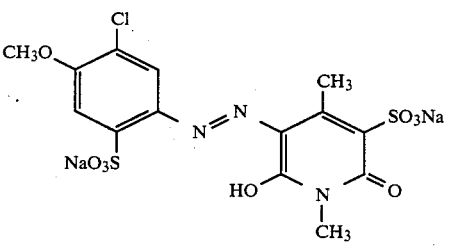 | 440 |
| 6 | 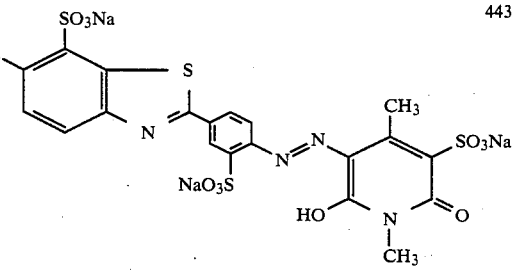 | 443 |
| 7 | 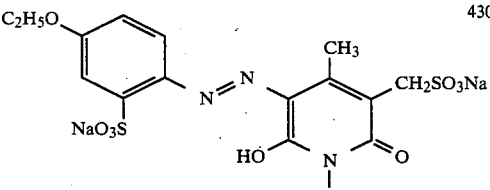 | 430 |
| 8 | 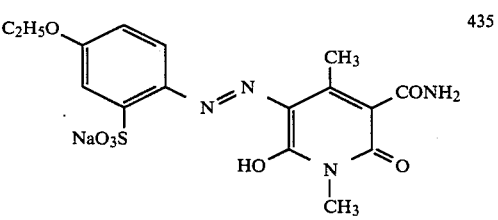 | 435 |
| 9 | 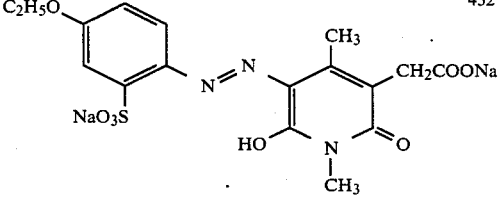 | 432 |
-continued
| No. | Structure | λmax. (nm) |
|---|---|---|
| 10 | 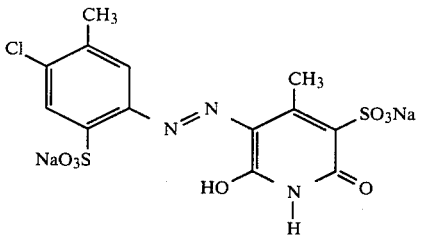 | 430 |
| 11 | 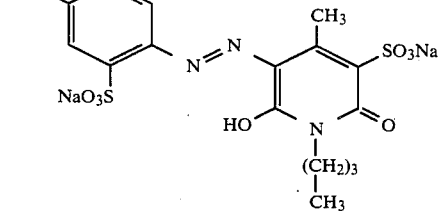 | 435 |
| 12 | 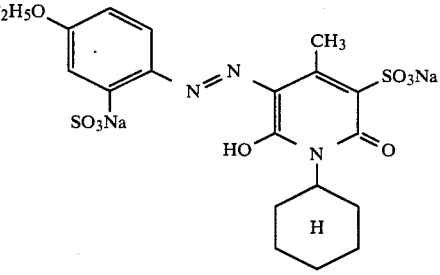 | 437 |
| 13 | 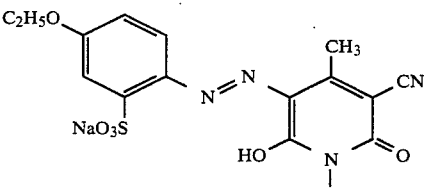 | 440 |
| 14 | 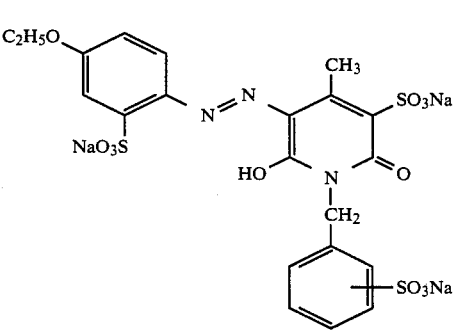 | 438 |
| 15 | 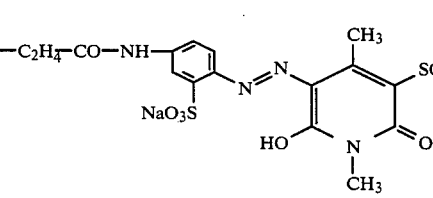 | 444 |

-continued

| No. | Structure | $\lambda_{max.}$ (nm) |
|---|---|---|
| 16 | [structure: $C_2H_5O$-phenyl ($LiO_3S$)-N=N-pyridone ($CH_3$, $SO_3Li$, OH, N-$CH_3$, =O)] | 438 |
| 17 | [structure: $CH_3$-phenyl ($NaO_3S$)-N=N-pyridone ($CH_3$, $CONH_2$, HO, N-$CH_2CH_2$-$SO_3Na$, =O)] | 424 |
| 18 | [structure: $C_2H_5O$-phenyl ($NaO_3S$)-N=N-pyridone ($CH_2$-$SO_3Na$, CN, OH, N-$C_2H_5$, =O)] | 445 |
| 19 | [structure: $C_2H_5O$-phenyl ($SO_3Na$)-N=N-pyridone ($CO_2H$, OH, N-H, =O)] | 440 |
| 20 | [structure: $C_2H_5O$-phenyl ($SO_3Na$)-N=N-pyridone ($CH_3$, OH, N-$CH_2$-$SO_3Na$, =O)] | 420 |
| 21 | [structure: $C_2H_5O$-phenyl ($NaO_3S$)-N=N-pyridone ($CH_3$, CO-$CH_3$, HO, N-phenyl-$SO_3Na$, =O)] | 448 |
| 22 | [structure: $C_2H_5O$-phenyl ($NaO_3S$)-N=N-pyridone ($CH_3$, CO-$CH_3$, HO, N-phenyl-S-$CH_2COOH$, =O)] | 444 |
| 23 | [structure: $CH_3CO$-NH-phenyl ($NaO_3S$)-N=N-pyridone ($CH_3$, HO, N-phenyl-O-$CH_2COOH$, =O)] | 450 |

The $\lambda_{max}$-values relate to filter films obtained in accordance with Example 1 or by incorporating a dye solutin in a corresponding, non-dyed gelatin film.

The production of dye No. 3 above is exemplified in the following:

Dye No. 3:

300 ml of 37% hydrochloric acid are added to 217 g of 2-amino-5-ethoxy benzene sulphonic acid in 2000 ml of water, followed by diazotisation at from 0 to 5° C. with a solution of 70 g of sodium nitrate in 250 ml of water. After 30 minutes, any nitrite still present is destroyed with amidosulphonic acid and the reaction mixture is introduced at from 0° to 10° C. into a solution of 219 g of 1,4-dimethyl-6-hydroxy pyridone-2-(3-sulphonic acid) and 150 g of sodium carbonate in 2000 ml of water. The pH is maintained above 10. After 3 hours, the reaction mixture is filtered under suction. After washing with saturated sodium chloride solution, the moist crude product is recrystallised from 2000 ml of water.

250 g of clean, (thin-layer) chromatographically homogeneous product are obtained in the form of orange-coloured crystals ($\epsilon$: 36000 in $H_2O$). More dye may be obtained from the mother liquor adjusted to pH 7 by separation with salt.

In one preferred embodiment, the dyes according to the present invention are fixed with mordants in photographic recording materials. Suitable mordants, particularly for fixing in yellow filter layers of colour photographic materials, are generally polymers having a high content of cationic centres of tertiary and quaternary ammonium groups. Particularly suitable mordants are water-soluble or water-dispersible cationic polyurethanes having an average molecular weight of from 10,000 to 60,000 and a degree of quaternisation of at least 40%, which contain the residue of an amino group-containing alkane diol and a urethane residue in an alternating sequence, as described, for example, in German Pat. No. 2,315,304. Other suitable mordants are the mordants known from German Offenlegungsschrift No. 2,941,819 which contain recurring units having the following structure:

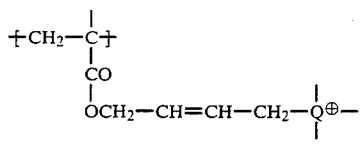

wherein Q represents hydrogen or phosphorus.

Other particularly suitable mordants are basic carriers of cross-linked polymer particles having a particle diameter of 1 μm and a content of quaternary ammonium or phosphonium groups of at least 2 mVal/g, of the type described in German Offenlegungsschrift No. 3,109,931.

Accordingly, the dyes according to the present invention are particularly suitable for photographic applications because, when they are released in alkaline processing baths, they do not affect sensitometry, do not colour backing layers and do not cause flocculation by salt formation. Surprisingly, they are bound very strongly to cationic mordants at pH values of ≦6.5 and may be washed out without difficulty at pH values of >10.

The dyes according to the present invention may be incorporated in the layers of a photographic recording material in the conventional way.

The dyes according to the present invention are suitable for filter layers in various photographic recording materials.

Recording materials of the type which contain non-diffusing colour couplers are particularly advantageous. In this case, at least one non-diffusing colour coupler, generally a coupler of the phenol or α-naphthol type, is generally associated with each red-sensitive silver halide emulsion layer to produce the cyan component dye image. In general, at least one non-diffusing colour coupler for producing the magenta component dye image, normally a colour coupler of the 5-pyrazolone, pyrolobenzimidazole, pyrazolotriazole and indazolone type, is associated with each of the green-sensitive silver halide emulsion layers. At least one non-diffusing colour coupler for producing the yellow component dye image, normally a colour coupler containing an open-chain β-diketomethylene or β-diketomethine group, is generally associated with each blue-sensitive silver halide emulsion layer. In this connection, reference is made by way of example to the publications "Farbkuppler (Colour Couplers)" by W. Pelz in "Mitteilungen aus den Forschungslaboratorien der Agfa, Leverkusen/Munchen" Vol. III, page 111 (1961), K. Venkataraman in "The Chemistry of Synthetic Dyes", Vol. 4, 341 to 387, Academic Press (1971) and T. H. James "The Theory of the Photographic Process", 4th Edition, pages 353 to 362.

The colour couplers may be both standard 4-equivalent couplers and also 2-equivalent couplers. The 2-equivalent couplers also include the known white couplers, although they do not produce a dye on reaction with colour developer oxidation products, and also DIR couplers, i.e. couplers which contain in the coupling position a releasable residue which may be released as a diffusing development inhibitor.

Other suitable additives for photographic recording materials are mentioned in the Journal "Product Licensing Index", Vol. 92, December 1971, pages 107 to 110, and also in the Research Disclosure Nr. 22534 of January 1983.

The silver halide emulsions used in the material may contain chloride, bromide and iodide or mixtures thereof as halide. It is preferred to use bromide and bromide iodide emulsions which may be ripened and optically sensitised in the conventional way. In this connection, reference is made in particular to Ullmanns Enzyklopadie der technischen Chemie, 4th Edition, Vol. 18, pages 424 et seq and 431 et seq. The recording materials may be stabilised. Particularly suitable stabilisers are azaindenes, preferably tetra- or penta-azaindenes, particularly those substituted by hydroxyl or amino groups. Such compounds are described, for example, in the Article by Birr in Z. Wiss, Phot. 47 (1952), 2–58. Other suitable stabilisers are inter alia heterocyclic mercapto compounds, for example phenyl mercaptotetrazole, quanternary benzthiazole derivatives and benzotriazole.

EXAMPLE 1

Layer 1 (comparison):

The following solutions are successively run, with stirring at 40° C. into 100 ml of a 15% gelatin solution:

1. 44 ml of an aqueous solution, adjusted to 25%, by weight, of the cationic polyurethane No. 20 according to German Offenlegungsschrift No. 2,315,304 and U.S. Pat. No. 3,877,945.
2. 30 ml of a 2% solution of sucrose monolaurate.
3. 75 ml of a 4% tartrazine solution adjusted to 40° C.
4. 70 ml of a 2% tris-acryloyl hexahydro-5-triazine solution (hardener).

After making up to 333 ml with distilled water, the solution is cast onto a support in a dry layer thickness of 2.5 μm.

Layers 2–10 (according to the present invention):

These layers are produced in the same way, except that 150 ml of a solution containing the same molar quantity of dyes 1, 2, 3, 4, 6, 9, 11, 13 and 19 (according to the present invention) are used instead of the 4% tartrazine solution.

After drying, the layers obtained produce the following densities as measured behind blue filters (Macbeth TD 504):

| Layer No. | Dye | Filter density |
| --- | --- | --- |
| 1 | tartrazine | 0.72 |
| 2 | 2 | 1.38 |
| 3 | 3 | 1.40 |
| 4 | 4 | 1.26 |
| 5 | 6 | 1.30 |
| 6 | 9 | 1.01 |
| 7 | 11 | 1.35 |
| 8 | 13 | 1.40 |
| 9 | 1 | 0.90 |
| 10 | 19 | 1.20 |

One strip of each of the filter layers obtained is rinsed for 20 minutes with distilled water in still water. The dyes are only washed out to a negligible extent, if at all.

In addition, one strip of each of the filter layers obtained is immersed for 6 minutes at 25° C. in a glass tube filled with first developer. The first developer has the composition described in Manual for Processing Kodak Ektachrome Film using Process E7, Eastman Kodak Company, 1977. All the layers are completely decoloured.

Example 1 shows that the dyes according to the present invention are fixed in non-diffusing form in colour photographic materials, but may be removed during processing.

Example 1 also shows the advantage of the dyes according to the present invention over the dye, tartrazine, known from U.S. Pat. No. 3,672,898. The dyes according to the present invention have a much higher strength of colour and, accordingly, make it possible to reduce the dry layer thickness of yellow filter layers in photographic recording materials. This provides for an increase in sharpness at the exposure stage and for a shorter diffusion path for chemicals and reaction products during processing.

EXAMPLE 2

Recording material A (comparison):

A photographic recording material comprising a yellow filter layer is prepared, substantially corresponding to the material described in German Offenlegungsschrift No. 3,148,108, Example A, recording material A, except for the fact that the yellow dye, tartrazine, was used instead of the yellow silver dispersion in the yellow filter layer. Accordingly, the layers described below were successively applied to a layer support of cellulose triacetate:

1. A red-sensitised silver halide emulsion containing a cyan coupler.
2. A 2% aqueous gelatin solution containing a polymeric white coupler.
3. A green-sensitised silver halide emulsion containing a magenta coupler.
4. A yellow filter layer obtained as follows:

The following solutions are successively added, with stirring at 40° C., to 100 ml of a 15% gelatin solution:
(a) 44 ml of an aqueous solution, adjusted to 25%, by weight, of cationic polyurethane No. 20 in German Offenlegungsschrift No. 2,315,304 and No. 20 in U.S. Pat. No. 2,877,945.
(b) 30 ml of a 2% solution of sucrose monolaurate.
(c) 150 ml of a 0.043 molar tartrazine solution.

After making up to 333 ml with distilled water, the solution is cast in a dry layer thickness of 2.5 μm. The filter density, as measured behind blue filters, amounts to 0.7.

5. A non-sensitised, blue-sensitive silver halide emulsion containing a yellow coupler.
6. A gelatin protective layer which was subsequently hardened.

Recording material B (according to the present invention):

The material B according to the present invention corresponds in all details to the comparison material A, except for the fact that dye No. 3 is used instead of the tartrazine. The solution is cast in a dry layer thickness of 1.6 μm. The filter density, as measured behind blue filters, amounts to 0.8.

Recording material C (according to the present invention):

Material C corresponds to material B, except for the fact that, instead of dye No. 3, dye No. 19 is used in the yellow filter layer.

After storage for 3 days at 20° C./45–60% relative air humidity (storage I), a sample of each of the recording materials A to C was exposed behind a continuous wedge and subjected to reversal processing as described in the "Manual Processing Ektachrome Film using Process E7" (Eastman-Kodak, 1977).

Further samples were stored for 3 days at 35° C./90% relative air humidity (storage II) and then exposed and processed in the same way. The sensitometric values cited in the following Table are obtained:

| | Storage | | | | | |
|---|---|---|---|---|---|---|
| | I | | | II | | |
| | yw | mg | cy | yw | mg | cy |
| Material A | | | | | | |
| S | 22.0 | 22.0 | 21.4 | 20.1 | 22.0 | 21.6 |
| $D_{max}$ | 3.27 | 3.28 | 2.94 | 3.30 | 3.0 | 3.01 |
| M | | 0.77 | 0.63 | | | |
| Material B (according to the present invention) | | | | | | |
| S | 21.8 | 21.7 | 21.4 | 20.5 | 22.1 | 21.6 |
| $D_{max}$ | 3.28 | 3.28 | 2.98 | 3.29 | 3.08 | 2.90 |
| M | | 0.82 | 0.68 | | | |
| Material C (according to the present invention) | | | | | | |
| S | 21.8 | 21.6 | 21.3 | 20.3 | 22.0 | 21.5 |
| $D_{max}$ | 3.22 | 3.22 | 2.93 | 3.30 | 3.02 | 2.80 |
| M | | 0.81 | 0.67 | | | |

S: Sensitivity, an increase of 0.3010 corresponds to a doubling of sensitivity.
$D_{max}$: Maximum density
M: Modulation transmission factor at a local frequency of 10 lines/mm, as measured with rectangular grids in accordance with G. Langner and R. Muller in "Mitteilungen aus den Forschungslaboratorien der Agfa-Gevaert AG", Leverkusen-Munchen, Vol.4, pages 339 et seq. The modulation transmission factor is a measure of the definition of photographic materials; reference is made in this connection to Ullmanns Enzyklopadie der technischen Chemie, 4th Edition, Vol. 18, 1979, pages 416 et seq.

The Table shows that, where the dyes according to the present invention are used, it is possible to produce filter layers which, compared with known filter dyes, for example tartrazine, have a considerably smaller layer thickness for the same absorption. This in turn provides for better definition, as reflected in the higher modulation transmission factor M. The values obtained for sensitivity and maximum density shows that this need not be obtained at the expense of a deterioration in other sensitometric values.

We claim:

1. A photographic material having one or more layers comprising at least one photosensitive silver halide emulsion layer wherein at least one layer contains in an effective amount a dye corresponding to the following general formula:

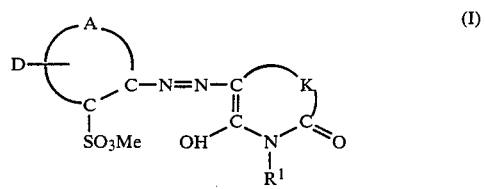

(I)

wherein
A represents the radical required to complete a diazo component of the benzene series,
K represents the radical required to complete a coupling cmponent of the class of hydroxy pyridones;
D represents a group having electron donor properties in the p-position to the azo group;
$R^1$ represents H or alkyl, cycloalkyl, aryl or aralkyl;
Me represents hydrogen or a cation;

with the proviso that at least one other solubilising group is present.

2. A recording material as claimed in claim 1, characterised in that the dye is contained in a yellow filter layer between a blue-sensitive layer and the red- and green-sensitive layers.

3. A recording material as claimed in claim 1, wherein the coupling component completed by K corresponds to the following general formula:

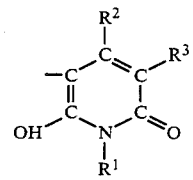

(II)

wherein
R¹ is as defined in claim 1;
R² represents an alkyl radical or a carboxyl group; and
R³ represents hydrogen or a functional group.

4. A recording material as claimed in claim 1, characterised in that the diazo component completed by A corresponds to the following general formula:

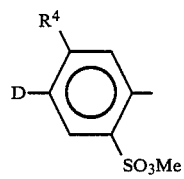

(III)

wherein
D and Me are as defined in claim 1; and
R⁴ represents hydrogen alkyl, alkoxy or halogen.

5. A recording material as claimed in claim 1, wherein the dye corresponds to the following general formula:

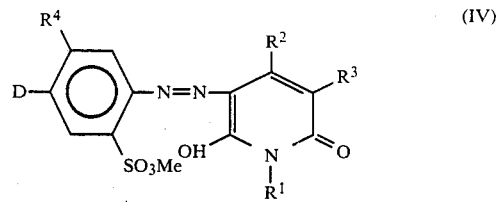

(IV)

wherein
D represents an alkyl, alkoxy, phenoxy, acylamino or alkoxy carbonyl amino group or a benzthiazolyl radical attached through the 2-position or halogen;
R¹ represents H or alkyl, cycloalkyl, aryl or aralkyl;
R² represents an alkyl or an esterified carboxyl group;
R³ represents H or —SO₃Me, —CH₂CO₂Me, —CH₂SO₃Me, —SO₂CH₃, —CONH₂, —CN, acyl or esterified carboxyl; and
R⁴ represents hydrogen, alkyl, alkoxy or halogen.

6. A recording material as claimed in claim 1, characterised in that the dye is fixed with a mordant.

7. A material as claimed in claim 6, characterised in that the mordant contains cationic centres containing ammonium and/or phosphonium groups.

8. A photographic recording material as claimed in claim 1, wherein R¹ is substituted alkyl, cycloalkyl, aryl or aralkyl.

9. A photographic material as claimed in claim 3, wherein R² is a substituted alkyl radical or an esterified carboxyl group.

10. A photographic material as claimed in claim 4, wherein R¹ is a substituted alkyl, cycloalkyl, aryl or aralkyl group.

11. A photographic material as claimed in claims 4 or 10 wherein R² is a substituted alkyl group.

* * * * *